(12) United States Patent
Han

(10) Patent No.: US 9,459,711 B2
(45) Date of Patent: Oct. 4, 2016

(54) POINTER CONTROL METHOD

(71) Applicant: Wacom Co., Ltd., Saitama (JP)

(72) Inventor: Yen-Hao Han, Hsinchu (TW)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 14/697,434

(22) Filed: Apr. 27, 2015

(65) Prior Publication Data

US 2015/0324021 A1 Nov. 12, 2015

Related U.S. Application Data

(63) Continuation of application No. 13/947,904, filed on Jul. 22, 2013, now Pat. No. 9,019,225.

(30) Foreign Application Priority Data

Mar. 6, 2013 (TW) .............................. 102107960 A

(51) Int. Cl.
G06F 3/046 (2006.01)
G06F 3/0354 (2013.01)
G06F 3/041 (2006.01)

(52) U.S. Cl.
CPC ........... G06F 3/03545 (2013.01); G06F 3/046 (2013.01); G06F 3/0416 (2013.01)

(58) Field of Classification Search
None
See application file for complete search history.

(56) References Cited

U.S. PATENT DOCUMENTS

| 6,603,464 | B1* | 8/2003 | Rabin | G06K 9/222 178/18.01 |
| 2004/0028274 | A1* | 2/2004 | Kawakami et al. | 382/187 |
| 2011/0193825 | A1 | 8/2011 | Yeh et al. | |
| 2014/0253523 | A1 | 9/2014 | Li | |

FOREIGN PATENT DOCUMENTS

| CN | 201503574 U | 6/2010 |
| CN | 102681677 A | 9/2012 |

OTHER PUBLICATIONS

Chinese Office Action dated Jun. 21, 2016, for corresponding CN Application No. 201310075309.2, 5 pages.

* cited by examiner

Primary Examiner — Robin Mishler
(74) Attorney, Agent, or Firm — Seed IP Law Group PLLC

(57) ABSTRACT

A pointer control method comprises a providing pointer upon a position input apparatus. Then a corresponding distance table is generated according to a moving distance of the pointer upon the position input apparatus, and a pressure gradient value range corresponding to the distance table is generated. A pressure table according to the pressure gradient value range is also generated. Finally, a tip pressure of the pointer is calculated according to a maximum pressure gradient value in the pressure gradient value range and a pressure gradient value corresponding to the moving distance of the pointer.

10 Claims, 3 Drawing Sheets

POINTER CONTROL METHOD

CROSS-REFERENCE TO RELATED APPLICATION

The entire contents of Taiwan Patent Application No. 102107960, filed on Mar. 6, 2013, and U.S. patent application Ser. No. 13/947,904, from which priority is claimed, are incorporated herein by reference.

BACKGROUND

1. Field of the Invention

The present disclosure generally relates to a pointer control method, and more particularly to a pointer control method which can provide a pointer with a tip pressure-sensitive function.

2. Description of Related Art

The operation principle of electromagnetic type input technology is performed by a circuit board with a plurality of antennas or sensor coils arranged along axial directions and an electromagnetic pen which can emit electromagnetic signals. The sensing plane of an electromagnetic input apparatus includes a plurality of antennas or sensor coils. The antennas or sensor coils are arranged under a work surface or a display panel of the electromagnetic input apparatus. The coordinates of the electromagnetic pen are obtained through the transmitting and receiving of electromagnetic waves between the circuit of the electromagnetic pen and the antennas or the sensor coils.

The circuit of the electromagnetic pen usually comprises an inductor, a capacitor and relative components enclosed in a case. The inductor constituted by a ferrite core winded with a metal coil and the capacitor constitute the circuit to transmit and receive electromagnetic signals with the antennas or sensor coils. The frequency of the circuit is determined according to the capacitance and the inductance connected in parallel. When a user utilizes the electromagnetic pen to perform writing function on the input apparatus, the tip of the electromagnetic pen being pressed would induce the continuous changes of the inductance or capacitance as well as the frequency of the circuit. The input apparatus detects and calculates the frequency of the electromagnetic signals received to obtain pressure levels of the electromagnetic pen via an internal circuit.

The main design principle for obtaining pressure gradient value of an electromagnetic pen mentioned above is to continuously change capacitance or inductance so as to alter the transmitting frequency of the oscillation circuit when the pen tip is pressed, so that a trigger structure connected to the pen tip which can change the capacitance or inductance is necessary.

The present disclosure focuses on a control method which can be used on a pen without a trigger structure connected to the pen tip so that any pen without a trigger structure can have a tip pressure-sensitive function.

BRIEF SUMMARY

The present disclosure provides a pointer control method. The pointer control method uses the moving speed of a pointer to calculate tip pressure and to simulate the tip pressure gradient value of the pointer. The faster the pointer moves, the smaller the tip pressure of the pointer is simulated. The pointer control method utilizes a distance table, a pressure table and the moving speed of a pointer to calculate and simulate the tip pressure of the pointer.

The disclosure provides a pointer control method, the method comprising the following steps. First of all, a pointer is applied upon a position input apparatus. Then a corresponding distance table is generated according to the moving distance of the pointer upon the position input apparatus, and a pressure gradient value range corresponding to the distance table is generated. A pressure table according to the pressure gradient value range is generated. Finally, a tip pressure of the pointer is calculated according to a maximum pressure gradient value in the pressure gradient value range and a pressure gradient value corresponding to the moving distance of the pointer.

DETAILED DESCRIPTION

Embodiments of this disclosure will be described in detail below. However, in addition to the features described below, this disclosure can be broadly implemented in the other cases. The purpose and scope of this disclosure is not limited to the precise forms disclosed. Some details that are not related to the disclosure may not be completely illustrated in order to simplify the disclosure.

Figure 1:
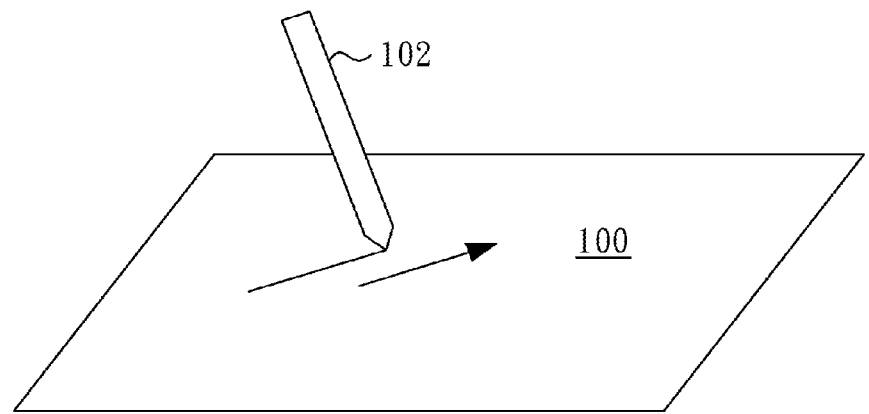
FIG. 1 shows an electromagnetic pointer and a sensing plane of an electromagnetic input apparatus according to one embodiment of the present disclosure.

FIG. 1 shows an electromagnetic pointer and a sensing plane of an electromagnetic input apparatus according to one embodiment of the present disclosure. As shown in FIG. 1, the electromagnetic pointer 102 performing input operation upon the sensing plane 100 of the electromagnetic input apparatus moves from coordinate $(x_1, y_1)$ to coordinate $(x_2, y_2)$. In one embodiment of the disclosure, the electromagnetic pointer 102 comprises, but is not limited to, an electromagnetic pointer without a trigger structure connected to the pen tip for performing a tip pressure-sensitive function. The electromagnetic pointer is merely an example of one embodiment of the disclosure, not a limitation. The embodiment of the disclosure is able to be applied any other suitable electromagnetic pointer.

Figure 2:
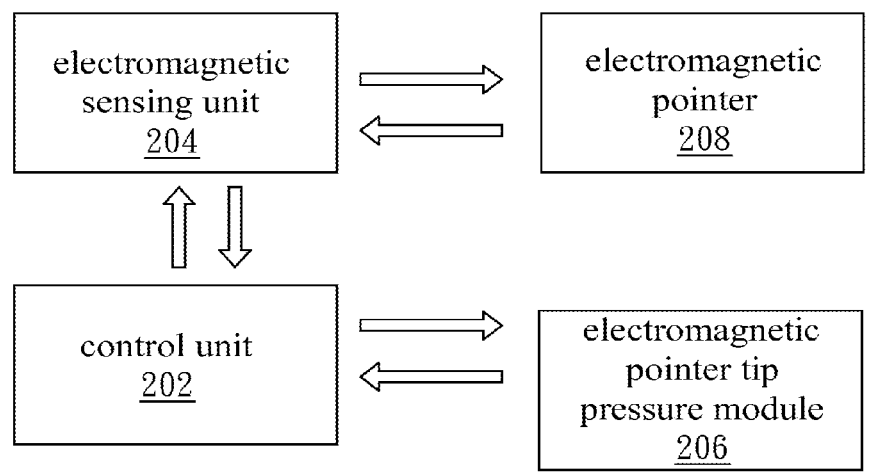
FIG. 2 shows an electromagnetic input apparatus according to one embodiment of the present disclosure.

FIG. 2 shows an electromagnetic input apparatus according to one embodiment of the present disclosure. In one embodiment of the disclosure, the electromagnetic input apparatus comprises a control unit 202, an electromagnetic sensing unit 204 and an electromagnetic pointer tip pressure module 206. The electromagnetic input apparatus comprises, but is not limited to, a digitizer and an electromagnetic input module of a mobile communication apparatus. The electromagnetic pointer tip pressure module 206 comprises firmware programs and memory storing the firmware programs so as to perform an electromagnetic pointer control method which can provide an electromagnetic pointer 208 with a tip pressure-sensitive function when the electromagnetic pointer 208 is applied upon the sensing plane of the electromagnetic input apparatus to perform input operation. Detailed contents of an electromagnetic pointer control method for providing an electromagnetic pointer with a tip pressure-sensitive function will be described in the following description.

Figure 3:
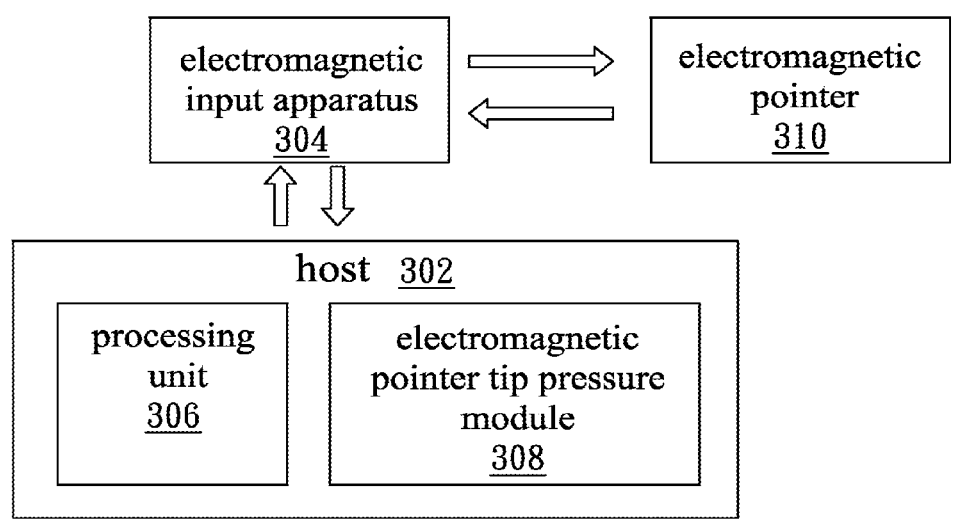
FIG. 3 shows an input system which applies one embodiment of the disclosure.

FIG. 3 shows an input system which applies one embodiment of the disclosure. In one embodiment of the disclosure, the input system comprises a host 302 and an electromagnetic input apparatus 304. The host 302 comprises, but is not limited to, a computer and a mobile communication apparatus. The host 302 comprises a processing unit 306 and an electromagnetic pointer tip pressure module 308. The electromagnetic pointer tip pressure module 308 comprises software programs and computer readable media storing the software programs so as to perform an electromagnetic pointer control method which can provide an electromagnetic pointer with a tip pressure-sensitive function when the electromagnetic pointer is applied upon the sensing plane of the electromagnetic input apparatus 304 to perform input operation. The computer readable medium stores executable codes or programs for the processing unit 306. The computer readable medium comprises storage mediums such as a hard drive, a memory, etc.

In one embodiment of the disclosure, the electromagnetic pointer control method with a tip pressure-sensitive function uses a distance table and a pressure table to transform the moving distance of an electromagnetic pointer to a tip pressure of the electromagnetic pointer. The electromagnetic pointer control method also uses a counter to moderate the increase of the tip pressure of the electromagnetic pointer and to prevent the initial tip pressure from being too large.

If the electromagnetic pointer shown in FIG. 1 moves from coordinate $(x_1, y_1)$ to coordinate $(x_2, y_2)$, the distance table is established with distance data according to the following:

$$D=\sqrt{(x_2-x_1)^2+(y_2-y_1)^2}$$

$$D_{Map_n}=n+1$$

$$n=0,1,2,\ldots,MaxP$$

wherein $D_{Map_n}$ is the moving distance of the electromagnetic pointer corresponding to pressure gradient value n in the distance table, 0, 1, 2, . . . , MaxP is the range of pressure gradient value.

In one embodiment of the disclosure, the tip pressure in the pressure table is calculated according to the following equation:

$$P_{Map_n} = MaxP \times \left(\frac{MaxP-n}{MaxP}\right)^\gamma + 0.5$$

$$n = 0, 1, 2, \ldots, MaxP$$

wherein $P_{Map_n}$ is the tip pressure in the pressure table, n is the pressure gradient value in the pressure table and the distance table in a predetermined moving distance, 0, 1, 2, . . . , MaxP is the range of pressure gradient value, MaxP is the maximum pressure gradient value corresponding to the maximum tip pressure. If the number of the pressure gradient values is 1024, $$n=0,1,2,\ldots,1023$$

$$MaxP=1023$$

if $n=MaxP$, $$P_{Map_n}=P_{Max}$$

wherein $P_{Max}$ is the maximum tip pressure. $\gamma$ is the pressure curve value which is determined according to requirement. The pressure curve is a line or linear if $\gamma=1$, and the tip pressure variation of the electromagnetic pointer is linear. The value 0.5 is used to round off.

In one embodiment of the disclosure, a counter value $P_{Count}$ is used to moderate the increase of the tip pressure of the electromagnetic pointer and to avoid the sudden increase of the tip pressure or the excess of the tip pressure over the predetermined pressure gradient value range.

$$P_{Count}=0,1,2,\ldots,MaxP$$

If the initial tip pressure is too large, the counter value $P_{Count}$ is used to moderate the increase of the tip pressure of the electromagnetic pointer.

Figure 4:
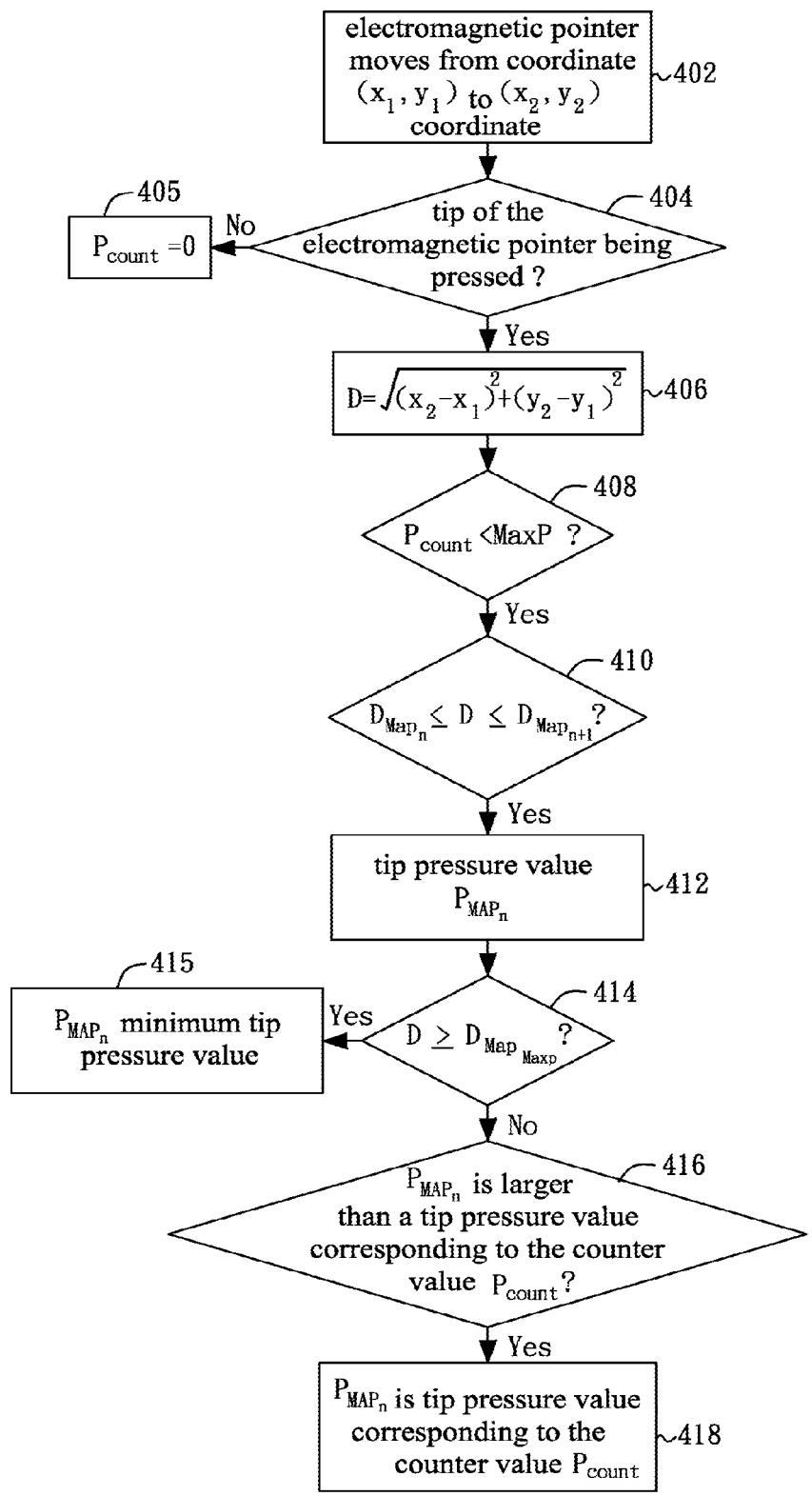
FIG. 4 shows a flow chart of an electromagnetic pointer control method with a tip pressure-sensitive function according to one embodiment of the present disclosure.

FIG. 4 shows a flow chart of an electromagnetic pointer control method with a tip pressure-sensitive function according to one embodiment of the present disclosure. As shown in FIG. 4, an electromagnetic pointer moves from coordinate $(x_1, y_1)$ to coordinate $(x_2, y_2)$ in step 402. Then in step 404, whether a tip of the electromagnetic pointer is pressed against a sensing plane of an electromagnetic input apparatus is determined. If the tip of the electromagnetic pointer is not pressed against the sensing plane of the electromagnetic input apparatus, then a counter value is determined as zero in step 405, that is, $P_{Count}=0$. If the tip of the electromagnetic pointer is pressed against the sensing plane of the electromagnetic input apparatus, then a moving distance D of the electromagnetic pointer is calculated in step 406, wherein $$D=\sqrt{(x_2-x_1)^2+(y_2-y_1)^2}$$

Next in step 408, the counter value $P_{Count}$ is compared to a maximum pressure gradient value MaxP corresponding to a maximum tip pressure to determine whether the counter value $P_{Count}$ is smaller than the maximum pressure gradient value MaxP. If the counter value $P_{Count}$ is smaller than the maximum pressure gradient value MaxP, then the counter value $P_{Count}$ is increased as the electromagnetic pointer moves. Then in step 410, whether the moving distance D is larger than or equal to a distance $D_{Map_n}$ corresponding to a pressure gradient value n of a distance table, and whether the moving distance D is smaller than or equal to a distance $D_{Map_{n+1}}$ corresponding to a pressure gradient value n+1 of the distance table is determined. If the moving distance D is larger than or equal to $D_{Map_n}$, and the moving distance D is smaller than or equal to $D_{Map_{n+1}}$, then a tip pressure value $P_{Map_n}$ is determined in step 412. Next in step 414, whether the moving distance D is larger than or equal to a distance $D_{Map_{MaxP}}$ corresponding to the maximum tip pressure gradient value MaxP of the distance table is determined. If the moving distance D is larger than or equal to the distance $D_{Map_{MaxP}}$, then the tip pressure value $P_{MAP_n}$ is determined as a minimum tip pressure value in step 415. If the moving distance D is not larger than or not equal to the distance $D_{Map_{MaxP}}$, then whether the tip pressure value $P_{MAP_n}$ is larger than a tip pressure value corresponding to the counter value $P_{Count}$ is determined in step 416. If the tip pressure value $P_{MAP_n}$ is larger than the tip pressure value corresponding to the counter value $P_{Count}$, then the tip pressure value $P_{MAP_n}$ is determined or reset as the tip pressure value corresponding to the counter value $P_{Count}$ in step 418. That is, whenever the tip pressure value $P_{MAP_n}$ is larger than the tip pressure value of the predetermined pressure table, in order to moderate the increase of the tip pressure, the tip pressure value $P_{MAP_n}$ is set as the tip pressure value corresponding to the counter value $P_{Count}$.

The embodiments of the disclosure can be applied on various electromagnetic pointers to perform various functions. Whether electromagnetic pointers are used to perform the embodiments of the disclosure depends on the requirements.

The electromagnetic pointer control method of the disclosure uses the moving speed of an electromagnetic pointer to compute the tip pressure calculation and to simulate the tip pressure gradient value of the electromagnetic pointer. The faster the electromagnetic pointer moves, the smaller the tip pressure of the electromagnetic pointer is simulated. The electromagnetic pointer control method utilizes a distance table, a pressure table and the moving speed of an electromagnetic pointer to calculate and simulate the tip pressure of the electromagnetic pointer. Moreover, the moderate increase counter values of a counter are used to moderate the increase of the tip pressure values. The moving distance of an electromagnetic pointer is converted to the tip pressure values thereof, or the signals of the coordinate movement of the electromagnetic pointer are transformed to tip pressure gradient value signals through firmware or software programs according to the embodiments of the disclosure. The electromagnetic pointer control method enables users to perform various functions of an electromagnetic pointer when the electromagnetic pointer is applied on electromagnetic input apparatus or system.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method, comprising:
   providing a pointer upon a position input apparatus;
   generating a distance table according to a moving distance of the pointer upon the position input apparatus, and a pressure gradient value range corresponding to the distance table;
   generating a pressure table according to the pressure gradient value range; and
   calculating a tip pressure of the pointer according to a maximum pressure gradient value in the pressure gradient value range and a pressure gradient value corresponding to the moving distance of the pointer.

2. The method of claim 1 further comprising a step of applying a counter to moderate an increase of the tip pressure.

3. The method of claim 2, wherein the counter has a counter value range corresponding to the pressure gradient value range.

4. A method for simulating a tip pressure value, comprising:
   generating distance data according to a moving distance of a pointer upon a position input apparatus, and a pressure gradient value corresponding to the distance data; and
   deriving a simulated tip pressure of the pointer according to the pressure gradient value corresponding to the moving distance of the pointer.

5. A non-transitory computer readable medium storing computer-executable codes that, in response to execution, cause a computer used with a position input device to:
   generate distance data according to a moving distance of a pointer upon a position input apparatus, and a pressure gradient value according to the distance data; and
   derive a simulated tip pressure of the pointer according to the pressure gradient value corresponding to the moving distance of the pointer.

6. The method of claim 4, wherein the deriving step includes calculating the simulated tip pressure of the pointer according to a maximum pressure value in a pressure value range and the pressure gradient value corresponding to the moving distance of the pointer.

7. The non-transitory computer readable medium of claim 5, wherein the codes, in response to execution, cause the computer to derive the simulated tip pressure according to a maximum pressure value in a pressure value range and the pressure gradient value corresponding to the moving distance of the pointer.

8. A method for simulating a tip pressure value, comprising:
   generating distance data according to a moving distance of a pointer upon a position input apparatus; and
   deriving a simulated tip pressure value according to the distance data, wherein a value of the simulated tip pressure is smaller when a moving speed of the pointer based on the moving distance of the pointer is faster.

9. The method of claim 8, wherein the moving speed of the pointer is derived in reference to a distance table that correlates the moving distance of the pointer with the moving speed.

10. The method of claim 8, wherein the moving speed of the pointer is calculated by diving the moving distance of the pointer per unit time.

* * * * *